US012646192B2

(12) United States Patent
Xu et al.

(10) Patent No.: US 12,646,192 B2
(45) Date of Patent: Jun. 2, 2026

(54) METHOD FOR MEASURING VOLUME OF POMELO BASED ON THREE VIEW ANGLE IMAGE CONTOUR FITTING

(71) Applicant: Institute of Facility Agriculture, Guangdong Academy of Agricultural Sciences, Guangzhou (CN)

(72) Inventors: Sai Xu, Guangzhou (CN); Huazhong Lu, Guangzhou (CN); Xin Liang, Guangzhou (CN)

(73) Assignee: Institute of Facility Agriculture, Guangdong Academy of Agricultural Sciences, Guangzhou (CN)

( * ) Notice: Subject to any disclaimer, the term of this patent is extended or adjusted under 35 U.S.C. 154(b) by 0 days.

(21) Appl. No.: 18/857,470

(22) PCT Filed: May 16, 2024

(86) PCT No.: PCT/CN2024/093610
§ 371 (c)(1),
(2) Date: May 28, 2025

(87) PCT Pub. No.: WO2025/020644
PCT Pub. Date: Jan. 30, 2025

(65) Prior Publication Data
US 2025/0285307 A1        Sep. 11, 2025

(30) Foreign Application Priority Data
Jul. 24, 2023    (CN) .......................... 202310906194.0

(51) Int. Cl.
*G06T 7/564*        (2017.01)
*G06T 7/12*          (2017.01)
(Continued)

(52) U.S. Cl.
CPC ................ *G06T 7/564* (2017.01); *G06T 7/12* (2017.01); *G06T 7/136* (2017.01); *G06T 7/62* (2017.01); *G06T 2207/30128* (2013.01)

(58) Field of Classification Search
CPC . G06T 2207/30128; G06T 7/564; G06T 7/62; G06T 7/10–136; G06T 7/194
See application file for complete search history.

(56) References Cited

FOREIGN PATENT DOCUMENTS

| CN | 102628682 A | 8/2012 |
| CN | 109632033 A | 4/2019 |

(Continued)

OTHER PUBLICATIONS

Goñi, Sandro M., Emmanuel Purlis, and Viviana O. Salvadori. "Three-dimensional reconstruction of irregular foodstuffs." Journal of Food Engineering 82.4 (2007): 536-547. (Year: 2007).*

(Continued)

*Primary Examiner* — Geoffrey E Summers

(57)        ABSTRACT

A method for measuring volume of pomelo based on three view image contour fitting is provided, for measuring the volume of the pomelo based on images, includes: a number of image capturing devices capturing a number of surface images of a pomelo to be measured; calibrating a position of an image capturing device for capturing a top view image of the pomelo to be measured; performing enhanced extraction processing on the number of surface images, and obtaining a standard contour image; obtaining a size of each pomelo slice based on the standard contour image, and obtaining a B-spline curve by fitting a contour of the pomelo slice; and calculating volume of each pomelo slice according to the B-spline curve, and obtaining total volume of the pomelo to be measured by calculating a sum of the volume of all of the pomelo slices.

2 Claims, 3 Drawing Sheets

(51) Int. Cl.
G06T 7/136          (2017.01)
G06T 7/62          (2017.01)

(56)                    References Cited

FOREIGN PATENT DOCUMENTS

| | | | | |
|---|---|---|---|---|
| CN | 110653166 A | 1/2020 | | |
| CN | 115035184 A | * 9/2022 | ............. | G06T 17/00 |
| CN | 116843743 A | 10/2023 | | |
| WO | 2017049346 A1 | 3/2017 | | |

OTHER PUBLICATIONS

Jana, Susovan, Ranjan Parekh, and Bijan Sarkar. "A De novo approach for automatic volume and mass estimation of fruits and vegetables." Optik 200 (2020): 163443. (Year: 2020).*
Khojastehnazhand, Mostafa, Mahmoud Omid, and Ahmad Tabatabaeefar. "Determination of orange volume and surface area using image processing technique." International Agrophysics 23.3 (2009): 237-242. (Year: 2009).*
Moreda, G. P., et al. "Non-destructive technologies for fruit and vegetable size determination—a review." Journal of Food Engineering 92.2 (2009): 119-136. (Year: 2009).*
Omid, M., M. Khojastehnazhand, and A. Tabatabaeefar. "Estimating volume and mass of citrus fruits by image processing technique." Journal of food Engineering 100.2 (2010): 315-321. (Year: 2010).*
Yan, L. I., et al. "Detection and Grading Method of Pomelo Shape Based on Contour Coordinate Transformation and Fitting." Smart Agriculture 3.1 (2021): 86. (Year: 2021).*
International Search Report of PCT Patent Application No. PCT/CN2024/093610 issued on Aug. 1, 2024.
Written Opinion of PCT Patent Application No. PCT/CN2024/093610 issued on Aug. 1, 2024.
Mingqing Wu et al., On-line measurement method for volume and surface area of red jujube based on multi-contour model, Transactions of the Chinese Society of Agricultural Engineering, Oct. 2019, pp. 283-290, vol. 35, No. 19.

* cited by examiner

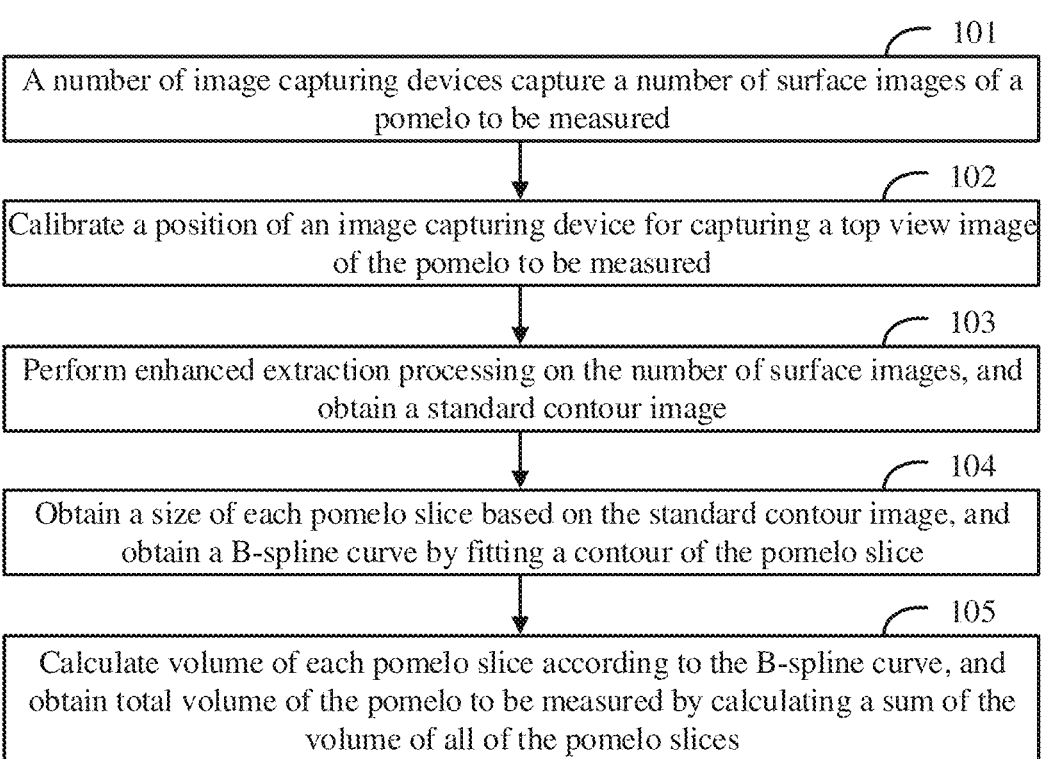

101

A number of image capturing devices capture a number of surface images of a pomelo to be measured

102

Calibrate a position of an image capturing device for capturing a top view image of the pomelo to be measured

103

Perform enhanced extraction processing on the number of surface images, and obtain a standard contour image

104

Obtain a size of each pomelo slice based on the standard contour image, and obtain a B-spline curve by fitting a contour of the pomelo slice

105

Calculate volume of each pomelo slice according to the B-spline curve, and obtain total volume of the pomelo to be measured by calculating a sum of the volume of all of the pomelo slices

FIG. 1

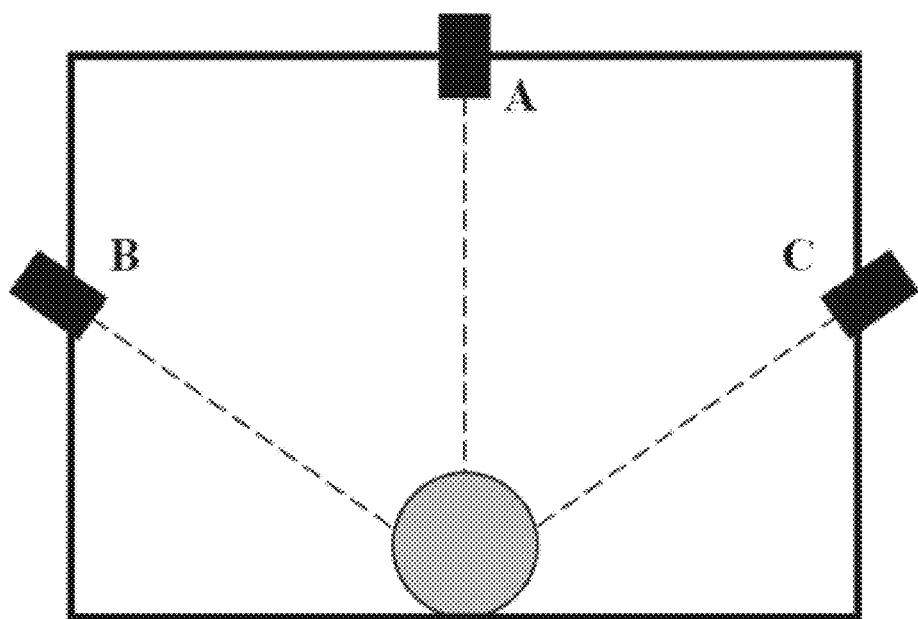

METHOD FOR MEASURING VOLUME OF POMELO BASED ON THREE VIEW ANGLE IMAGE CONTOUR FITTING

The present disclosure claims priority of Chinese Patent Application No. 202310906194.0, entitled "a method for measuring volume of pomelo based on three view angle image contour fitting", filed on Jul. 24, 2023 in the China National Intellectual Property Administration, the entire contents of which are incorporated by reference herein.

FIELD

The subject matter herein generally relates to a technology field of volume measurement based on images, and particularly to a method for measuring volume of pomelo based on three view angle image contour fitting.

BACKGROUND

Pomelo is one of subtropical fruits, and is rich in nutrients. China is a major producer of pomelos, in recent years, some large-scale pomelo production companies have gradually led the Chinese pomelo market, and required rapid non-destructive detection and sorting of pomelo quality in the actual production. During the detection and sorting of pomelos, volume is an important reference index, accurate volume measurement can not only perform preliminary sorting of pomelos based on sizes, but also provide key data for the detection accuracy of internal indexes such as edible rate and sugar degree. Therefore, it is very important to achieve high-precision and high-efficiency detection of pomelo volume in the pomelo detection and sorting line.

A traditional volume measurement method of pomelo is carried out manually using a drainage method in practical application. However, manual measurement has problems such as high labor intensity, low efficiency, and long time consumption. With the rapid development of computer and image technology, machine vision has shown great potential in the field of non-destructive detection of pomelo, at present, a variety of fruit volume measurement methods have applied the machine vision technology. At present, the existing fruit volume measurement methods based on the machine vision technology mainly include an ellipsoid fitting measurement method, a slice integral measurement method, a multi-contour measurement method, a depth camera measurement method, a machine learning measurement method, and a multi-view 3D reconstruction measurement method. The ellipsoid fitting measurement method directly takes the fruit to be measured as an ellipsoid, and measures the volume approximately, which is suitable for fruits such as watermelons and cantaloupes, but has large error for non-ellipsoidal fruits. A slice circle fitting integral measurement method decomposes the fruit into multiple slices along specific directions, approximates each slice to a circle, calculates the volume of each slice, and finally obtains the fruit volume by superimposing the volumes of all of the slices. A multi-contour surface approximation measurement method establishes a rotation platform, selects a rotation center, captures fruit images every 6 to 12 degrees, and utilizes a curve approximation fitting method to establish a wireframe model. The depth camera measurement method utilizes a depth camera to measure the fruit volume, the accuracy is poor. The machine learning measurement method utilizes a depth camera to extract geometric features of a depth image, and utilizes the geometric features to train a volume prediction model. The multi-view 3D reconstruction method obtains multi-angle images of the fruit to be measured, and utilizes a stereoscopic vision 3D reconstruction algorithm to restore a 3D model of the pomelo, and calculates the pomelo volume based on the 3D model of the pomelo.

The ellipsoid fitting method, the slice circle fitting integral method, and the depth camera measurement method have the defect of low precision. When measuring the volume of the fruits of different varieties and sizes, the machine learning measurement method is required to prepare different training models, and each time a new fruit is required to be measured, the model is required to be retrained, which has limitation. The structure of the model of the multi-contour surface approximation measurement method is complex, and dozens of images are required to be captured for a single pomelo, which is inefficient. The multi-view 3D reconstruction requires the rotation platform, and the measurement takes a long time each time, which is not suitable for actual production.

Based on the above, it can be seen that the current volume measurement methods on the market have the problem of difficulty in balancing measurement accuracy and efficiency, and there is an urgent requirement for a pomelo volume measurement method with a simple structure, high accuracy, and high efficiency.

SUMMARY

A purpose of the present disclosure is to provide a method for measuring volume of pomelo based on three view angle image contour fitting, to solve the technical problems existing in the above prior art.

To realize the above purpose, the present disclosure provides the following technical solution:

a method for measuring volume of pomelo based on three view angle image contour fitting, includes:

a number of image capturing devices capturing a number of surface images of a pomelo to be measured;

calibrating a position of an image capturing device for capturing a top view image of the pomelo to be measured;

performing enhanced extraction processing on the number of surface images, and obtaining a standard contour image;

obtaining a size of each pomelo slice based on the standard contour image, and obtaining a B-spline curve by fitting a contour of the pomelo slice; and calculating volume of each pomelo slice according to the B-spline curve, and obtaining total volume of the pomelo to be measured by calculating a sum of the volume of all of the pomelo slices.

Optionally, calibrating the position of the image capturing device for capturing the top view image of the pomelo to be measured includes:

placing a calibration plate horizontally at an average height of the pomelo, an intrinsic parameter matrix of a camera A is:

$$K_A = \begin{pmatrix} f_x & 0 & c_x \\ 0 & f_y & c_y \\ 0 & 0 & 1 \end{pmatrix};$$

$$\begin{pmatrix} u \\ v \\ 1 \end{pmatrix} = \frac{1}{z} \begin{pmatrix} f_x & 0 & c_x \\ 0 & f_y & c_y \\ 0 & 0 & 1 \end{pmatrix} \begin{pmatrix} X \\ Y \\ Z \end{pmatrix};$$

measuring a vertical distance $Z_A$ from the camera A to the calibration plate; and the camera A capturing the top view image of the pomelo vertically downward.

Optionally, extracting a contour of each of the number of surface images includes:

each surface image includes three channels, R, G, and B, converting a color space of each of the surface images to a HSI color space, extracting a red R channel image and a hue H channel image, performing threshold segmentation on the red R channel image and the hue H channel image, and superimposing the red R channel image and the hue H channel image, extracting a contour in the superimposed image using an edge detection operator, the above processing is performed on each of the number of surface images of the pomelo to be measured captured by the three image capturing devices, and a total of three contour images are obtained.

Optionally, performing enhanced extraction processing on the number of surface images, and obtaining the standard contour image includes:

sequentially performing contour extraction, contour image size adjustment, and contour vertical baseline determination on the surface image, and obtaining the standard contour image.

Optionally, obtaining the size of each pomelo slice based on a pomelo slice preprocessing result includes:

determining each row of pixels in the standard contour image as the image slice, and there are H image slices from the pomelo stalk end downward. Taking an image slice i as an example, counting the number of black pixels of the image slice i from a left end to a right end of the image slice, and ending at a white pixel, the number of black pixels is determined as $x_{i1}$, flipping the image slice horizontally, and counting the number of black pixels of the image slice from the left end to the right end, the number of black pixels in the flipped image slice is determined as $x_{i2}$, w is a width value of the image slice, then:

$$u_{Li} = x_{i1};$$

$$u_{Ri} = w - x_{i2};$$

in the image slice i, a distance $D_{Li}$ from a left end $A_i$ of the pomelo to the vertical baseline $M_i$ is as follows:

$$D_{Li} = u_M - u_{Li};$$

in the image slice i, a distance $D_{Ri}$ from a right end $B_i$ of the pomelo to the vertical baseline $M_i$ is as follows:

$$D_{Ri} = u_{Ri} - u_M;$$

thus, two lists can be determined, a distance list $D_L$ of the pomelo contour in the image slice from H left endpoints to the vertical baseline is as follows:

$$D_L = [D_{L0}, D_{L1}, D_{L2}, D_{L3}, \ldots, D_{LH}];$$

a distance list $D_R$ of the pomelo contour in the image slice from H right endpoints to the vertical baseline is as follows:

$$D_R = [D_{R0}, D_{R1}, D_{R2}, D_{R3}, \ldots, D_{RH}];$$

in the three images captured by the cameras A, B, and C, the lists of the left and right endpoints of the pomelo are $A_L$, $A_R$, $B_L$, $B_R$, $C_L$, and $C_R$, respectively, the distance lists of the above endpoints to the vertical baseline M are $D_{LA}$, $D_{RA}$, $D_{LB}$, $D_{RB}$, $D_{LC}$, and $D_{RC}$ respectively;

the included angle between the camera B and the horizontal plane is $\alpha$, and the camera B captures the image of the left side of the pomelo; the included angle between the camera C and the horizontal plane is $\beta$, and the camera C captures the image of the right side of the pomelo.

Optionally, obtaining the B-spline curve by fitting the contour of the pomelo slice includes:

fitting the pomelo slice along a transverse direction in a polar coordinate system; taking the contour vertical baseline M as the pole, determining the positions of the slice endpoints $A_L$, $A_R$, $B_L$, $B_R$, $C_L$, and $C_R$ in the polar coordinate system according to the included angle between the camera and the horizontal plane; converting the polar coordinate system to a rectangular coordinate system, performing interpolation fitting on the $A_L$, $A_R$, $B_L$, $B_R$, $C_L$, and $C_R$ using a cubic B-spline curve, and obtaining a cubic B-spline curve P(t).

Optionally, calculating the volume of each pomelo slice based on the B-spline curve includes:

calculating the number of pixels $N_i$ enclosed by the B-spline curve $P_i(t)$ of the slice i, then the volume $V_i$ of each single slice is calculated as follows:

$$V_i = \frac{N_i \times Z_A^3}{f_x^2 \times f_y}.$$

Compared with the prior art, the present disclosure has the following beneficial effects:

the present disclosure provides a rapid and high-precision measurement method for pomelo volume, which is suitable for fruit volume measurement of spherical, ellipsoid, drop shape, column shape and other shapes; the present disclosure guarantees high precision, has high measurement efficiency, and can be practically applied to pomelo sorting line; at the same time, the present disclosure can be realized with simple structure, the cost is low, the structure only includes three cameras and brackets with fixed positions, the present disclosure has high precision, through experiments, average error of measuring the volume of 120 pomelos is 2.24%; in addition, the measurement efficiency of the present disclosure is high, the volume measurement can be completed when the pomelo is transmitted on the conveyor belt, without rotating the pomelo and other operations.

BRIEF DESCRIPTION OF THE DRAWINGS

The present disclosure is further explained in combination with the attached drawings below:

FIG. 1 is a flowchart of a method according to the present disclosure;

FIG. 2 is schematic view of positions of a number of image capturing device;

DETAILED DESCRIPTION

Figure 3:
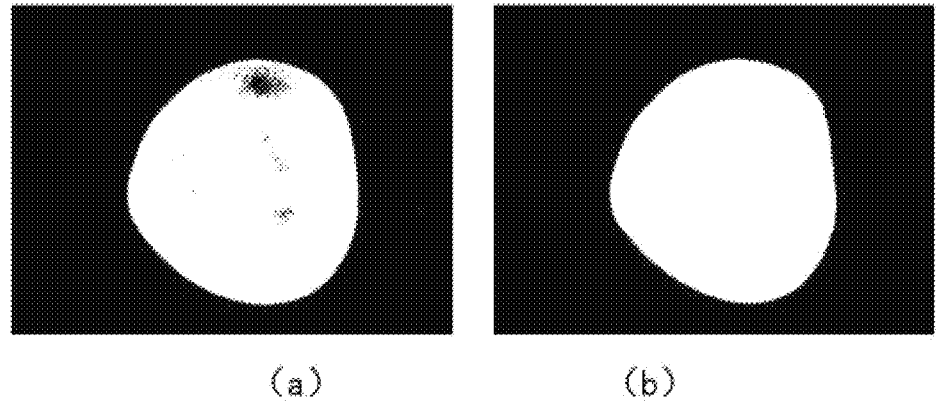
FIG. 3 is a schematic view of image superposition during contour extraction.

The following is a detailed description of technical solutions in embodiments of the present disclosure in conjunction with the drawings in the embodiments of the present disclosure, obviously, the described embodiments are only part of the embodiments of the present disclosure, rather than all of the embodiments; based on the embodiments of the present disclosure, all other embodiments obtained by those skilled in the art without making creative work belong to the scope of protection of the present disclosure.

Embodiment 1

The embodiment discloses a method for measuring volume of pomelo based on three view image contour fitting, as shown in FIG. 1, the method includes:

Step 101: a number of image capturing devices capture a number of surface images of a pomelo to be measured.

Step 102: calibrate a position of an image capturing device for capturing a top view image of the pomelo to be measured.

Step 103: perform enhanced extraction processing on the number of surface images, and obtain a standard contour image.

Step 104: obtain a size of each pomelo slice based on the standard contour image, and obtain a B-spline curve by fitting a contour of the pomelo slice.

Step 105: calculate volume of each pomelo slice according to the B-spline curve, and obtain total volume of the pomelo to be measured by calculating a sum of the volume of all of the pomelo slices.

Specifically:

During a specific implementation, the pomelo to be measured is laid flat on a tray of a conveyor belt, black light-absorbing materials are placed under the pomelo to be measured, three cameras A, B, and C are arranged in a transverse direction of the pomelo, as shown in FIG. 2, the camera A captures an image of an upper part of the pomelo vertically downward; an included angle between the camera B and a horizontal plane is $\alpha$, the camera B captures an image of a left side of the pomelo; an included angle between the camera C and the horizontal plane is $\beta$, the camera C captures an image of a right side of the pomelo.

The camera is used as the image capturing device in the embodiment, in actual implementation, according to actual requirements, the camera is calibrated by calibrating the position of the image capturing device for capturing the top view image of the pomelo to be measured, calibrating the position of the image capturing device for capturing the top view image of the pomelo to be measured includes:

placing a calibration plate horizontally at an average height of the pomelo, where an intrinsic parameter matrix of the camera A is:

$$K_A = \begin{pmatrix} f_x & 0 & c_x \\ 0 & f_y & c_y \\ 0 & 0 & 1 \end{pmatrix};$$

$$\begin{pmatrix} u \\ v \\ 1 \end{pmatrix} = \frac{1}{z} \begin{pmatrix} f_x & 0 & c_x \\ 0 & f_y & c_y \\ 0 & 0 & 1 \end{pmatrix} \begin{pmatrix} X \\ Y \\ Z \end{pmatrix};$$

measuring a vertical distance $Z_A$ from the camera A to the calibration plate;

the camera A capturing the top view image of the pomelo vertically downward.

Further, extracting a contour of each of the number of surface images, includes:

in actual implementation, each camera captures an image, and three images are the number of surface images of the pomelo under different viewing angles; each surface image includes three channels, R, G, and B, convert a color space of each of the surface images to a HSI color space, extract a red R channel image and a hue H channel image, perform threshold segmentation on the red R channel image and the hue H channel image, and superimpose the red R channel image and the hue H channel image, extract a contour in the superimposed image using an edge detection operator, the above processing is performed on each of the number of surface images of the pomelo to be measured captured by the three image capturing devices, and a total of three contour images are obtained. A schematic view of image superposition during contour extraction is shown in FIG. 3, part (a) of FIG. 3 represents a binary image of the H channel, and part (b) represents a binary image of the I channel.

Figure 4:
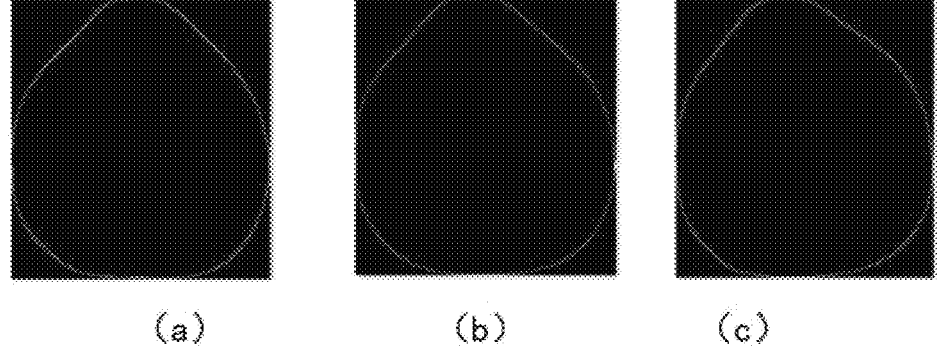
FIG. 4 is a schematic view of an image alignment result.

Performing enhanced extraction processing on the number of surface images, and obtaining the standard contour image includes:

sequentially performing contour extraction, contour image size adjustment, and contour vertical baseline determination on the surface image, and obtaining the standard contour image. In detail, performing image alignment on the surface image, includes: segmenting the surface image according to the contour of the pomelo, and adjusting the size of the surface image using bilinear interpolation, so that the number of pixels in a height direction of the three surface images is H. A schematic view of an image alignment result is shown in FIG. 4, part (a) of FIG. 4 represents a contour image of a left-side view, part (b) represents a contour image of a right-side view, and part (c) represents a contour image of a top view.

Figure 5:
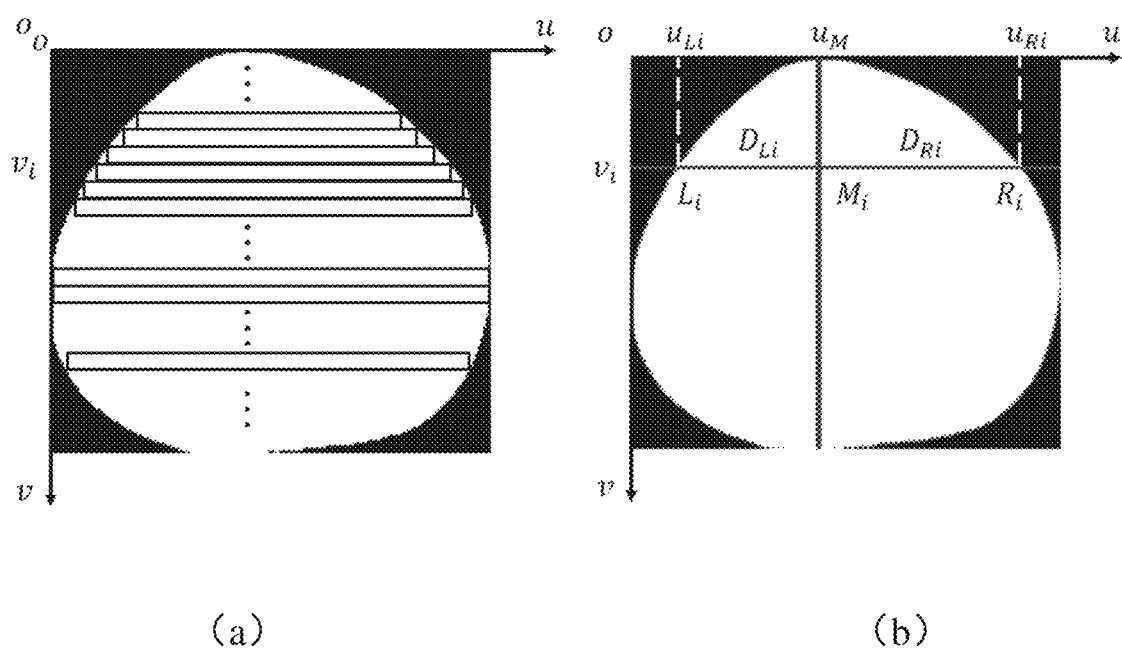
FIG. 5 is a schematic view of obtaining a size and a shape of a slice.

Referring to a part (a) and a part (b) of FIG. 5, FIG. 5 illustrates a coordinate system corresponding to the pomelo slice, an x-axis represents a width u of the pomelo slice, and a y-axis represents a height v of the pomelo slice, determining a contour vertical baseline $u_M$, includes: after the image alignment, the height of the image is H, obtaining an average value $u_M$ of all of the contour points with $v < 10\%$ H, that is, the coordinates of the contour points u at the edge of the pomelo stalk end, determining a vertical line downward from a point $(u_M, 0)$ as the contour vertical baseline, and the abscissa coordinate of the contour vertical baseline is $u_M$.

Figure 6:
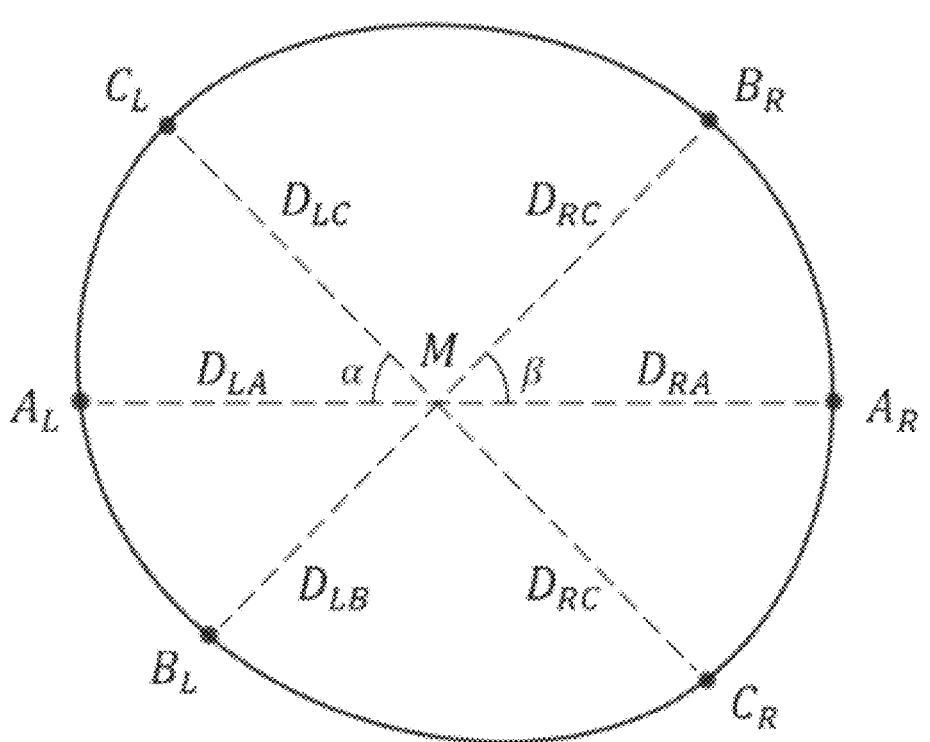
FIG. 6 is a schematic view of a result of fitting a contour of a slice of a pomelo using a spline curve.

The size of each pomelo slice is obtained based on a pomelo slice preprocessing result, the pomelo slice is an image slice, in detail, the size of each pomelo slice is obtained by:

determining each row of pixels in the standard contour image as the image slice, and there are H image slices from the pomelo stalk end downward. Taking an image slice i as an example, counting the number of black pixels of the image slice i from a left end to a right end of the image slice, and ending at a white pixel, the number of black pixels is determined as $x_{i1}$, flipping the image slice horizontally, and counting the number of black pixels of the image slice from the left end to the right end, the number of black pixels in the flipped image slice is determined as $x_{i2}$, w is a width value of the image slice, then:

$$u_{Li} = x_{i1};$$

$$u_{Ri} = w - x_{i2};$$

in the image slice i, a distance $D_{Li}$ from a left end $A_i$ of the pomelo to the vertical baseline $M_i$ is as follows:

$$D_{Li} = u_M - u_{Li};$$

in the image slice i, a distance $D_{Ri}$ from a right end $B_i$ of the pomelo to the vertical baseline $M_i$ is as follows:

$$D_{Ri} = u_{Ri} - u_M;$$

thus, two lists can be determined, a distance list $D_L$ of the pomelo contour in the image slice from H left endpoints to the vertical baseline is as follows:

$$D_L = [D_{L0}, D_{L1}, D_{L2}, D_{L3}, \dots, D_{LH}];$$

a distance list $D_R$ of the pomelo contour in the image slice from H right endpoints to the vertical baseline is as follows:

$$D_R = [D_{R0}, D_{R1}, D_{R2}, D_{R3}, \dots, D_{RH}];$$

in the three images captured by the cameras A, B, and C, the lists of the left and right endpoints of the pomelo are $A_L$, $A_R$, $B_L$, $B_R$, $C_L$, and $C_R$, respectively, the distance lists of the above endpoints to the vertical baseline M are $D_{LA}$, $D_{RA}$, $D_{LB}$, $D_{RB}$, $D_{LC}$, and $D_{RC}$ respectively;
the included angle between the camera B and the horizontal plane is α, and the camera B captures the image of the left side of the pomelo; the included angle between the camera C and the horizontal plane is β, and the camera C captures the image of the right side of the pomelo. The schematic view of the obtained size of the image slice is shown in FIG. 5, part (a) of FIG. 5 shows the schematic view of the pomelo slice, and part (b) shows the schematic view of the obtained contour size data.
obtaining the B-spline curve by fitting the contour of the pomelo slice includes:
fitting the pomelo slice along a transverse direction in a polar coordinate system. Taking the contour vertical baseline M as the pole, determining the positions of the slice endpoints $A_L$, $A_R$, $B_L$, $B_R$, $C_L$, and $C_R$ in the polar coordinate system according to the included angle between the camera and the horizontal plane; converting the polar coordinate system to a rectangular coordinate system, performing interpolation fitting on the $A_L$, $A_R$, $B_L$, $B_R$, $C_L$, and $C_R$ using a cubic B-spline curve, and obtaining a cubic B-spline curve P(t). The schematic view of the spline curve fitting result of the pomelo slice contour is shown in FIG. 6.
calculating the volume of each pomelo slice based on the B-spline curve, includes:
calculating the number of pixels $N_i$ enclosed by the B-spline curve $P_i(t)$ of the slice i, then the volume $V_i$ of each single slice is calculated as follows:

$$V_i = \frac{N_i \times Z_A^3}{f_x^2 \times f_y}.$$

The total volume V of the pomelo is calculated as follows:

$$V = \sum_{i=1}^{H} V_i.$$

The embodiments of the present disclosure are described in detail above in conjunction with the accompanying drawings, but the present disclosure is not limited to the above embodiments, and various changes can be made within the knowledge scope of those skilled in the art without departing from the purpose of the present disclosure.

What is claimed is:
1. A method for measuring volume of pomelo based on three view angle image contour fitting, comprising:
a number of cameras capturing a number of surface images of a pomelo to be measured, the number of cameras comprising a camera A, a camera B, and a camera C, three view angle comprising view angles of cameras A, B, and C, the pomelo to be measured comprising a number of pomelo slices;
calibrating a position of one of the number of cameras for capturing a top view image of the pomelo to be measured comprised in the number of surface images;
performing enhanced extraction processing on the number of surface images, and obtaining a standard contour image;
obtaining a size of each of the number of pomelo slices based on the standard contour image, and obtaining a B-spline curve by fitting a contour of each of the number of pomelo slices, wherein obtaining the size of each of the number of pomelo slices based on the standard contour image comprises:
determining each row of pixels in the standard contour image as an image slice, and there are H image slices from a stalk end of the pomelo downward, taking an image slice i as an example, counting the number of black pixels of the image slice i from a left end to a right end of the image slice, and ending at a white pixel, the number of black pixels is determined as $x_{i1}$, flipping the image slice horizontally, and counting the number of black pixels of the image slice from the left end to the right end, the number of black pixels in the flipped image slice is determined as $x_{i2}$, w is a width value of the image slice, then:

$$u_{Li} = x_{i1};$$

$$u_{Ri} = w - x_{i2};$$

in the image slice i, a distance $D_{Li}$ from a left end $A_i$ of the pomelo to the vertical baseline $M_i$ is as follows:

$$D_{Li} = u_M - u_{Li};$$

represents an average value of all of coordinates of contour points u at an edge of the stalk end of the pomelo;

in the image slice i, a distance $D_{Ri}$ from a right end $B_i$ of the pomelo to the vertical baseline $M_i$ is as follows:

$$D_{Ri} = U_{Ri} - u_M;$$

thus, two lists can be determined, a distance list $D_L$ of the pomelo contour in the image slice from H left endpoints to the vertical baseline is as follows:

$$D_L = [D_{L0}, D_{L1}, D_{L2}, D_{L3}, \ldots, D_{LH}];$$

a distance list $D_R$ of the pomelo contour in the image slice from H right endpoints to the vertical baseline is as follows:

$$D_R = [D_{R0}, D_{R1}, D_{R2}, D_{R3}, \ldots, D_{RH}];$$

wherein the number of surface images comprises three images captured by the cameras A, B, and C, in the three images captured by the cameras A, B, and C, the lists of the left and right endpoints of the pomelo are $A_L$, $A_R$, $B_L$, $B_R$, $C_L$, and $C_R$, respectively, the distance lists of the above endpoints to the vertical baseline M are $D_{LA}$, $D_{RA}$, $D_{LB}$, $D_{RB}$, $D_{LC}$, and $D_{RC}$ respectively; the included angle between the camera B and the horizontal plane is $\alpha$, and the camera B captures the image of the left side of the pomelo; the included angle between the camera C and the horizontal plane is $\beta$, and the camera C captures the image of the right side of the pomelo; and calculating volume of each of the number of pomelo slices according to the B-spline curve, and obtaining total volume of the pomelo to be measured by calculating a sum of the volume of all of the number of pomelo slices.

2. A method for measuring volume of pomelo based on three view angle image contour fitting, comprising:

a number of cameras capturing a number of surface images of a pomelo to be measured, the number of cameras comprising a camera A, a camera B, and a camera C, three view angle comprising view angles of cameras A, B, and C, the pomelo to be measured comprising a number of pomelo slices;

calibrating a position of one of the number of cameras for capturing a top view image of the pomelo to be measured comprised in the number of surface images;

performing enhanced extraction processing on the number of surface images, and obtaining a standard contour image;

obtaining a size of each of the number of pomelo slices based on the standard contour image, and obtaining a B-spline curve by fitting a contour of each of the number of pomelo slices; and calculating volume of each of the number of pomelo slices according to the B-spline curve, and obtaining total volume of the pomelo to be measured by calculating a sum of the volume of all of the number of pomelo slices, wherein calculating the volume of each of the number of pomelo slices based on the B-spline curve comprises:

calculating the number of pixels $N_i$ enclosed by the B-spline curve $P_i(t)$ of an image slice i, then the volume $V_i$ of each of the number of pomelo slices is calculated as follows:

$$V_i = \frac{N_i \times Z_A^3}{f_x^2 \times f_y}.$$

wherein $Z_A$ represents a vertical distance from the camera A to a calibration plate, $f_x$ and $f_y$ represent normalized focal lengths in an intrinsic parameter matrix of the camera A.

* * * * *